UNITED STATES PATENT OFFICE 1,997,440

ETHYLHYDROCUPREINE COMPOUND AND METHOD OF MAKING THE SAME

Leandro William Tomarkin, Locarno, Switzerland

No Drawing. Application August 29, 1932, Serial No. 630,904. In Germany September 4, 1931

5 Claims. (Cl. 260—25)

My invention refers to a remedy against pneumococcus infections and other diseases and more especially to a new compound, which I believe to be a salt-like addition product of ethylhydrocupreine, and to the method of producing this compound.

As is well known to those skilled in the art, ethylhydrocupreine

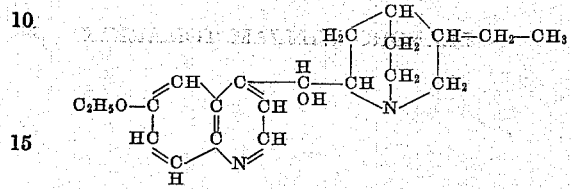

has been found useful in combating pneumococcus infections and for other therapeutical purposes.

I have now found that by combining this compound with sulfosalicylic acid and hexamethylene-tetramine I obtain a compound whose administration is more agreeable to the patients than that of the ethylhydrocupreine itself.

In producing the new compound formed of one molecule ethylhydrocupreine, 2 mols. sulfosalicylic acid and 2 mols. hexamethylenetetramine, I may react ethylhydrocupreine and sulfosalicylic acid with hexamethylenetetramine-sulfosalicylate or ethylhydrocupreine-sulfosalicylate with hexamethylenetetramine-sulfosalicylate or ethylhydrocupreine-sulfosalicylate with hexamethylenetetramine and sulfosalicylic acid or ethylhydrocupreine and sulfosalicylic acid with hexamethylenetetramine and sulfosalicylic acid or ethylhydrocupreine with hexamethylene-tetramine-sulfosalicylate in excess of the calculated quantity or ethylhydrocupreine and hexamethylenetetramine and sulfosalicylic acid, both these latter in excess of the calculated quantity. In all these cases, hexamethylenetetramine may be present in excess of the calculated quantity.

While ethylhydrocupreine-sulfosalicylate as well as hexamethylenetetramine-sulfosalicylate dissolve in cold alcohol only with difficulty, the compound according to the present invention readily dissolves in alcohol, any of the components, which may still be present, remaining undissolved.

I have found by experiments on animals, that the admissible dose of the hexamethylenetetramine-sulfosalicylate derivative of ethylhydrocupreine-sulfosalicylate, calculated on the quantity of ethylhydrocupreine present in the compound, is the sixfold of the admissible dose of ethylhydrocupreine itself. Apart from the advantages afforded in therapeutical respect, the new compound is also distinguished by a higher solubility in water. It has a pH value of about 5.1, which can be shifted towards the neutral point, the solubility being at the same time increased still further if the compound is dissolved under addition of hexamethylenetetramine or produced with an excess quantity of hexamethylenetetramine.

In practising my invention I may for instance proceed as follows:—

Example 1

17 parts by weight ethylhydrocupreine are dissolved in 80 parts alcohol. To the warm solution is added a solution of 11 parts sulfosalicylic acid in 40 parts alcohol and the mixture kept at a temperature of about 40–60° C. After some time the solution becomes turbid and fine long needles separate out, until after about one hour the reaction mixture as a whole solidifies. It is now cooled to room temperature, stirred with 250 parts ether and allowed to stand several hours under repeated stirring. The crystal broth is now filtered by vigorous suction, washed with a 1:3 mixture of alcohol and ether, rinsed with pure ether and thereafter dried at the open air. There is thus obtained ethylhydrocupreine-sulfosalicylate as a crystalline mass, which melts at about 174–178° C., being colored yellow when melting.

28 parts of this salt are dissolved together with 11 parts sulfosalicylic acid in 160 parts alcohol and to the hot solution is added a warm solution of 14 parts hexamethylenetetramine in 80 parts alcohol. The mixture is concentrated by evaporation in a thin layer at room temperature in vacuo, ultimately in the presence of concentrated sulfuric acid. There is thus obtained a colorless powder which decomposes when heated or acted upon with acids or alkalis and which dissolves slowly in water, more readily in alcohol.

Example 2

17 parts ethylhydrocupreine and 14 parts hexamethylenetetramine are dissolved in 160 parts alcohol. 22 parts sulfosalicylic acid are dissolved in 40 parts alcohol. The two warm solutions are mixed, the mixture cooled and evaporated as a thin layer at room temperature, ultimately in vacuo. One thus obtains the same compound as described with reference to Example 1.

As explained above, the quantity of hexamethylenetetramine present is preferably greater than that theoretically required for the production of the new complex compound.

Various changes may be made in the details disclosed in the foregoing specification without departing from the invention or sacrificing the advantages thereof.

I claim:—

1. The compound which is the addition product of 1 mol. ethylhydrocupreine, 2 mols. sulfosalicylic acid and 2 mols. hexamethylenetetramine linked together probably according to the formula

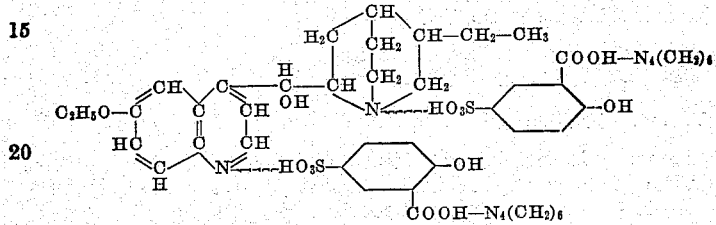

being a colorless powder which decomposes when heated or acted upon with an acid or an alkali and which slowly dissolves in water, more readily in alcohol.

2. The method of producing the compound claimed in claim 1, comprising reacting its three constituents in warm alcoholic solution.

3. The method of producing the compound claimed in claim 1, comprising preparing alcoholic solutions of 1 mol. ethylhydrocupreine, 2 mols. sulfosalicylic acid and 2 mols. hexamethylene tetramine, mixing the warm solutions and concentrating the mixture by evaporation in vacuo.

4. The method of producing the compound claimed in claim 1, comprising acting on ethyl hydrocupreine sulfosalicylate with hexamethylene-tetramine sulfosalicylate in warm alcoholic solution.

5. The method of producing the compound claimed in claim 1, comprising preparing alcoholic solutions of 1 mol. ethylhydrocupreine, 2 mols sulfosalicylic acid and more than 2 mols. hexamethylene tetramine, mixing the warm solutions and concentrating the mixture by evaporation in vacuo.

LEANDRO WILLIAM TOMARKIN.